United States Patent [19]

Tsuda

[11] Patent Number: 4,727,384

[45] Date of Patent: Feb. 23, 1988

[54] LIQUID JET RECORDING HEAD

[75] Inventor: Hisanori Tsuda, Atsugi, Japan

[73] Assignee: Canon Kabushiki Kaisha, Tokyo, Japan

[21] Appl. No.: 756,311

[22] Filed: Jul. 18, 1985

[30] Foreign Application Priority Data

Jul. 30, 1984 [JP] Japan .............................. 59-157701

[51] Int. Cl.⁴ .............................................. G01D 15/16

[52] U.S. Cl. ................................................ 346/140 R

[58] Field of Search ........................................ 346/140

[56] References Cited

U.S. PATENT DOCUMENTS 4,484,202 11/1984 Sayko .................................. 346/140

4,493,137 1/1985 Bader .............................. 346/140 X 4,500,895 2/1985 Buck .................................... 346/140

4,503,442 3/1985 Barbero .............................. 346/140

*Primary Examiner*—Joseph W. Hartary

*Attorney, Agent, or Firm*—Fitzpatrick, Cella, Harper & Scinto

[57] ABSTRACT

A liquid jet recording head comprises a recording head element having a discharge port for discharging liquid to form flying droplets and an energy generating element for generating an energy to form the droplets, an ink tank for storing the liquid to be supplied into the recording head element, and wirings electrically connected to the energy generating element. Th wirings are embedded in a member constituting the ink tank, and the recording head element is arranged on a wall of the ink tank.

15 Claims, 5 Drawing Figures

LIQUID JET RECORDING HEAD

BACKGROUND OF THE INVENTION

1. Field of the Invention

The present invention relates to a liquid jet recording head which jets liquid and forms flying droplets to print characters or the like.

2. Description of the Prior Art

An ink jet recording method (liquid jet recording method) enables high speed recording because of negligible noise generated in printing and can print characters on a plain paper without special treatment. Accordingly, interest in the ink jet recording method has been increasing.

One liquid jet recording method, disclosed in Japanese unexamined patent publication No. 51837/1979 and West Germany DOLS No. 2843064, is different from other liquid jet recording method in that a thermal energy is imparted to the liquid as a motive force to discharge droplets.

In the disclosed recording method, the liquid activated by the thermal energy undergoes a state change including a rapid increase in volume, and the liquid is discharged from an orifice at an end of the recording head to form the flying droplets, which are deposited on a record medium.

The liquid jet recording method disclosed in DOLS No. 2843064 is effectively applied to a drop-on demand recording method and allows high speed printing of a high resolution and high quality image because a high density multi-orifice recording head is easy to manufacture.

The recording head used in the above recording method includes a liquid discharge unit having a discharge port through which the liquid is discharged to form the flying droplets and an energy activating portion connected to the discharge port for imparting to the liquid the energy to discharge droplets, and an energy generation element, which may be an electro-thermal transducer having a pair of electrodes and a heat generating resistive layer connected to the electrodes and having a heat generating region between the electrodes.

The electrodes have wirings through which an energy from a power supply is supplied. The wirings are arranged on a substrate as shown in FIG. 4, in which numeral 41 denotes a platen, numeral 42 denotes a record paper, numerals 43 and 44 denote two guide shafts, numeral 45 denotes a carriage, numeral 46 denotes a recording head having an electrical signal distributing flexible printed circuit (FPC) board 50, numeral 47 denotes a head mount attached to a carriage 45 by a bolt (not shown), numerals 48 and 49 denote an ink supply tube and an ink tank, respectively, of liquid supply means, and numeral 51 denotes an electrical connector for connecting the FPC 50.

The use of the separate large wiring board increases the cost. The bonding of the board to other members is necessary and high accuracy positioning is required in bonding those members. Accordingly, this structure is not suitable to mass production. Further, insulation of the wirings on the board is also required.

SUMMARY OF THE INVENTION

It is an object of the present invention to provide a liquid jet recording head which can simplify manufacturing steps, reduce the size of the wiring unit and reduce the cost.

It is another object of the present invention to provide a liquid jet recording head comprising a recording head element having a discharge port for discharging liquid to form flying droplets and an energy generating element for generating an energy to form the droplets, an ink tank for storing the liquid to be supplied to the recording head element, and wirings electrically connected to the energy generating element, the wirings being embedded in a member of the ink tank and the recording head element being arranged on a wall of the ink tank.

DETAILED DESCRIPTION OF THE PREFERRED EMBODIMENT

Figure 1:
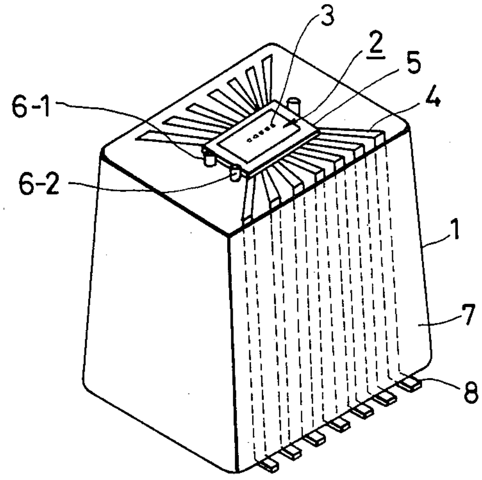
FIGS. 1 and 3 show liquid jet recording heads of the present invention.

FIG. 1 shows one embodiment of the liquid jet recorder of the present invention. Numeral 1 denotes a recording head, numeral 2 denotes a recording head element having an energy activating portion (not shown) therein and numeral 3 denotes discharge ports for discharging the liquid to form flying droplets. The energy activating portion has an electro-thermal transducer which is an energy generating element for generating energy to discharge the liquid. Electrodes for supplying an electrical signal to the electro-thermal transducer are arranged on a head substrate of the recording head element. The discharge ports 3 are arranged in correspondence with the electro-thermal transducers. Pads of the electrodes are arranged around the head element and electrically connected to wirings 4 which are external electrodes of the recording head element. Numeral 5 denotes a mold for protecting a connecting portion of the wirings 4 and electrodes (not shown) of the recording head element. Numerals 6-1 and 6-2 denote positioning means on a mount surface for the recording head element and projecting from an outer frame 7 of an ink tank for positioning the recording head element. The wirings 4 are exposed from the ink tank outer frame 7 near the junction to the recording head element but are embedded in the ink tank outer frame 7 on the side of the ink tank outer frame 7 as shown by broken lines. The wirings 4 are exposed at the bottom of the ink tank outer frame 7 to form a connection area 8 which is connected to electrodes (not shown) on a recorder main unit.

Figure 2B:
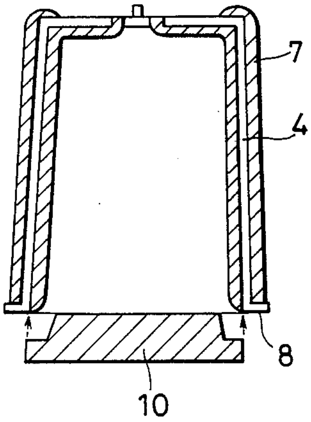
FIG. 2B is a sectional view taken along a chain line X—X' in FIG. 2A.
Figure 2A:
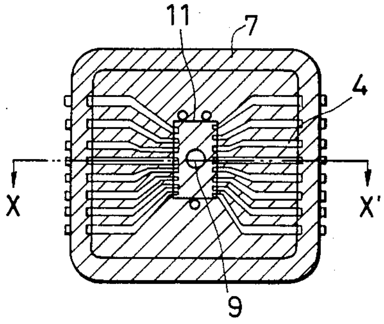
FIG. 2A is a plan view of integrally formed ink tank outer frame external electrodes.
Figure 3:
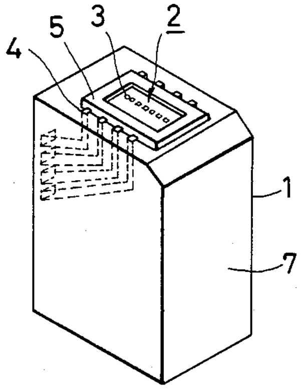
Figure 4:
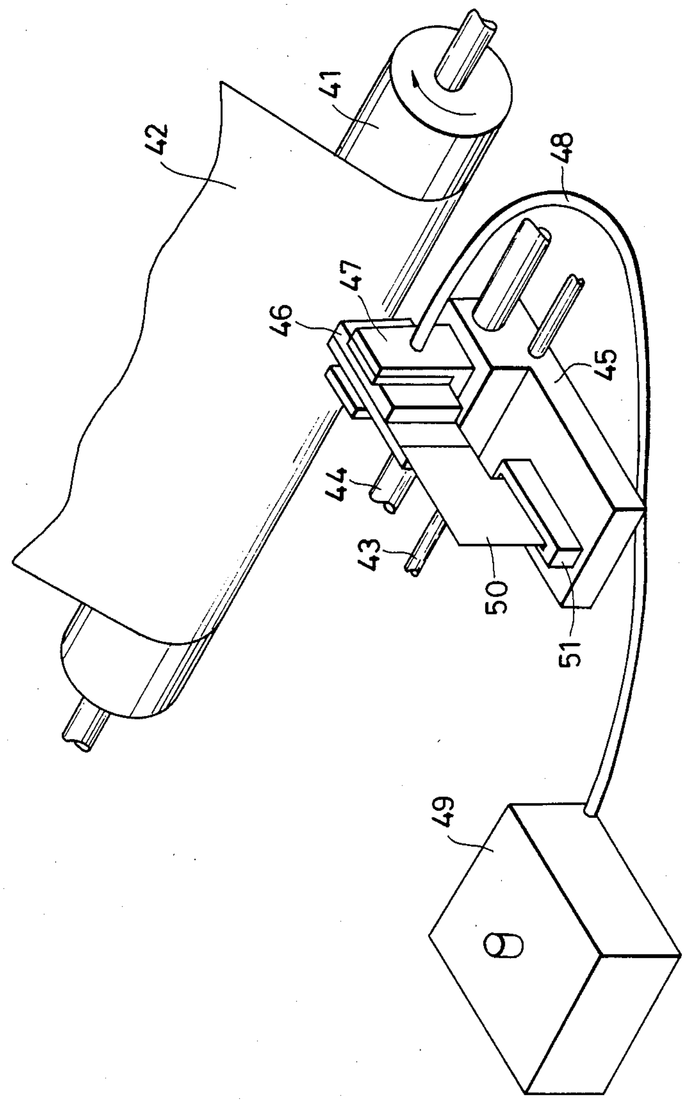
FIG. 4 PRIOR ART
FIG. 4 shows a prior art liquid jet recording head.

FIG. 2A is a top view of the ink tank outer frame 7 and the wirings 4 formed in union therewith, and FIG. 2B is a sectional view taken along a line X—X' in FIG. 2A. Numeral 9 denotes a hole through which ink is supplied into the recording head element 2 from the ink tank in the ink tank outer frame 7. Numeral 10 denotes a rear cover. The connector terminals 8 of the wirings 4 need not be arranged on the opposite side of the recording head element 2 but they may be arranged on the side or the top of the ink tank outer frame 7 as shown in FIG. 3. Numeral 11 denotes a mount position of the recording head element.

The ink tank may be an ink bag accommodated in the ink tank outer frame 7 and connected to the hole 9, or alternatively, the space formed by the ink tank outer frame 7 and the rear cover 10 may be used as the ink tank. A vent hole or a clearance may be formed so that air is introduced into the space as the ink is consumed.

Most portions of the wirings 4 need not be embedded in the ink tank outer frame 7 but at least a portion thereof may be embedded if the wirings are secured and sufficiently protected from the ink.

The ink tank and the wirings may be formed in union by setting the preformed wirings on an ink tank mold die and forming the ink tank with a resin by a mold insert method. The preferable resin used to form the ink tank is phenol resin, uria resin, ABS resin or polyester resin.

The recording head element 2 comprises a recording head substrate having a heat generating resistive layer and at least a pair of opposing electrodes electrically connected to the resistive layer, a liquid chamber which is adjacent to a heat generating area between the opposing electrodes on the substrate and is filled with the liquid, and a discharge port which is formed in correspondence with the heat generating area and communicates with the liquid chamber. Thus, the area of the support member is minimized and the material required for the support member such as silicon, metal or ceramics can be reduced.

The positioning means for the recording head element may be used to position the recording head to the apparatus. Alternatively, a separate recording head positioning means may be formed on the ink tank outer wall or the recording head element mount plane.

In the liquid jet recording head of the present invention, the wirings can be formed without extending the electrodes on the substrate . Therefore only the recording head element and the connector need be bonded. Insulation for the wirings is not necessary. The manufacturing process is simplified and mass production is made possible by resin molding. Accordingly, cost reduction is easily attained.

The liquid jet recording head shown in FIG. 1 can be formed in the following manner.

The wirings 4 are formed by copper-nickel alloy in a shape shown in FIG. 2B and they are set on a resin mold die. Phenol resin is inserted by a molding insert method to form the ink tank outer frame 7.

The pitch of the wirings 4 is one line/mm in the embedded area, and two lines/mm (200 μm width) at the exposed area near the junction to the head substrate. The head element having the discharge port for discharging the flying droplets, the energy generating element for generating the energy to form the droplets, and the energy acting portion for imparting the energy to the liquid are mounted and electrically connected. Then, the ink tank filled with the liquid is mounted such that the liquid is supplied to the head element, and the ink tank outer frame rear cover is mounted to complete the recording head.

The recording head was used to actually record an image. The recorded image showed no difference from that recorded by a prior art recording head. No disadvantage due to the exposure of the wirings of the present recording head was observed. The present recording head improves the manufacturing process and reduces the number of manufacturing steps.

What is claimed is:

1. A liquid jet recording head comprising:

a recording element having a discharge port for discharging liquid to form flying droplets, an energy generating element for generating energy to form the droplets and a first terminal electrically connected to said energy generating element for supplying an electrical signal to said energy generating element;

an ink tank for storing liquid to be supplied to said recording element, wherein said recording element is arranged on a wall of said ink tank and said ink tank includes a second terminal electrically connected to said first terminal;

wiring electrically connected to said second terminal to supply an electrical signal to said energy generating element through said terminals, at least a portion of said wiring being embedded in said ink tank; and recording element positioning means arranged on said ink tank to position said recording element relative to said ink tank.

2. A liquid jet recording head according to claim 1, wherein said ink tank includes an ink tank outer frame and a rear cover.

3. A liquid jet recording head according to claim 2, wherein said ink tank outer frame is made of resin.

4. A liquid jet recording head according to claim 1, wherein said ink tank has an ink bag therein.

5. A liquid jet recording head according to claim 4, wherein said ink tank has a communication unit for communicating a space in said ink tank with atmosphere.

6. A liquid jet recording head according to claim 1, further comprising a communication unit for communicating the inside of said ink tank with atmosphere.

7. A liquid jet recording head according to claim 1, wherein said positioning means also serves as recording head positioning means.

8. A liquid jet recording head according to claim 1, wherein positioning means is arranged on a recording element mount plane.

9. A liquid jet recording head according to claim 8, wherein said positioning means is integrally formed with said ink tank.

10. A liquid jet recording head according to claim 1, wherein said positioning means is integrally formed with said ink tank.

11. A liquid jet recording head according to claim 1, wherein said energy generating element includes an electro-thermal transducer.

12. A liquid jet recording head according to claim 11, wherein said electro-thermal transducer includes a heat generating resistive layer arranged on a support and at least one pair of opposing electrodes electrically connected to said resistive layer.

13. A liquid jet recording head according to claim 1, wherein an ink supply hole is formed in said ink tank .

14. A liquid jet recording head according to claim 1, wherein the electrical connection area of said recording element and said wiring is sealed by resin.

15. A liquid jet recording head comprising:

a recording element having a discharge port for discharging liquid to form flying droplets, an energy generating element for generating energy to form the droplets and a first terminal electrically connected to said energy generating element for supplying an electrical signal to said energy generating element;

an ink tank for storing liquid to be supplied to said recording element, wherein said recording element is arranged on a wall of said ink tank and said ink tank includes a second terminal electrically connected to said first terminal;

wiring electrically connected to said second terminal to supply an electrical signal to said energy generating element through said terminals, at least a portion of said wiring being integrally molded in a wall of said ink tank; and recording element positioning means arranged on said ink tank to position said recording element relative to said ink tank.

* * * * *